(12) United States Patent
Gunzelmann et al.

(10) Patent No.: US 9,106,298 B2
(45) Date of Patent: Aug. 11, 2015

(54) SUPPRESSION OF ADJACENT CHANNEL INTERFERENCE BY ADAPTIVE CHANNEL FILTERING IN MOBILE RADIO RECEIVERS

(75) Inventors: Bertram Gunzelmann, Koenigsbrunn (DE); Xiaofeng Wu, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 575 days.

(21) Appl. No.: 12/134,054

(22) Filed: Jun. 5, 2008

(65) Prior Publication Data

US 2008/0242256 A1 Oct. 2, 2008

Related U.S. Application Data

(63) Continuation of application No. 11/131,524, filed on May 18, 2005, now abandoned, which is a continuation of application No. PCT/DE03/03657, filed on Nov. 5, 2003.

(30) Foreign Application Priority Data

Nov. 18, 2002 (DE) .................................. 102 53 671

(51) Int. Cl.
*H04B 1/10* (2006.01)
*H04L 27/22* (2006.01)

(52) U.S. Cl.
CPC .............. *H04B 1/1036* (2013.01); *H04L 27/22* (2013.01)

(58) Field of Classification Search
CPC .................. H03F 2200/294; H03F 2200/372; H03F 2200/331; H03F 3/195; H03F 3/45188; H03F 2200/513; H03F 2203/45644; H03F 3/45192; H03F 1/3211; H03F 3/45183; H03F 3/50; H03F 3/68; H03F 3/72; H03G 1/0029; H04B 1/1036; H04B 2001/0433; H04B 1/1027; H04B 2001/1054; H04B 7/2621; H04B 1/005; H04B 1/0057; H04B 1/006; H04B 1/30; H04B 1/406; H04B 7/02; H01L 2924/0002; H01L 2924/00; H01L 23/5227
USPC ......... 375/145, 147, 220, 243, 259, 250, 260, 375/295, 316, 340, 348, 350, 354, 355, 371
See application file for complete search history.

(56) References Cited

U.S. PATENT DOCUMENTS 5,287,556 A 2/1994 Cahill
5,422,909 A * 6/1995 Love et al. .................... 375/147

(Continued)

FOREIGN PATENT DOCUMENTS

| DE | 10152628 | 5/2003 |
| WO | WO-00/77939 | 12/2000 |
| WO | WO 02/01718 A1 * | 1/2002 |

OTHER PUBLICATIONS

ETSI EN 300 910 V8.5.1 (Nov. 2000), European Standard, Digital Cellular Telecommunications System (Phase 2+); Radio Transmission and Reception, Global System for Mobile Communications 05.05 version 8.5.1, Release 1999.

*Primary Examiner* — Hirdepal Singh
(74) *Attorney, Agent, or Firm* — Schiff Hardin LLP

(57) ABSTRACT

A channel filter (200) with a variable pass bandwidth has a first low-pass filter (200.2) on the input side and is driven by a means (30) for controlling the pass bandwidth as a function of the adjacent channel interference. A first input of the control means (30) is connected to the first low-pass filter (200.2), and a second input is connected to a bandpass filter (200.4) which is connected in parallel with the channel filter (200). The signal path which contains the low-pass filter (200.2) contains a means (37) for removing a DC signal component or DC component.

28 Claims, 3 Drawing Sheets

(56) References Cited

U.S. PATENT DOCUMENTS

| | | |
|---|---|---|
| 5,493,717 A | 2/1996 | Schwarz et al. |
| 6,606,359 B1 | 8/2003 | Nag et al. |
| 7,110,478 B2 * | 9/2006 | Lin et al. .................. 375/340 |
| 7,162,218 B2 * | 1/2007 | Axness et al. ............. 455/324 |
| 2002/0075950 A1 * | 6/2002 | Cowley ..................... 375/222 |
| 2003/0067368 A1 * | 4/2003 | Ohara et al. .............. 333/188 |
| 2003/0081706 A1 * | 5/2003 | Ciccarelli et al. .......... 375/350 |
| 2003/0157914 A1 * | 8/2003 | Li et al. .................... 455/296 |
| 2004/0190661 A1 * | 9/2004 | Vrazel ...................... 375/350 |
| 2004/0213566 A1 * | 10/2004 | Takanashi et al. .......... 398/32 |

* cited by examiner

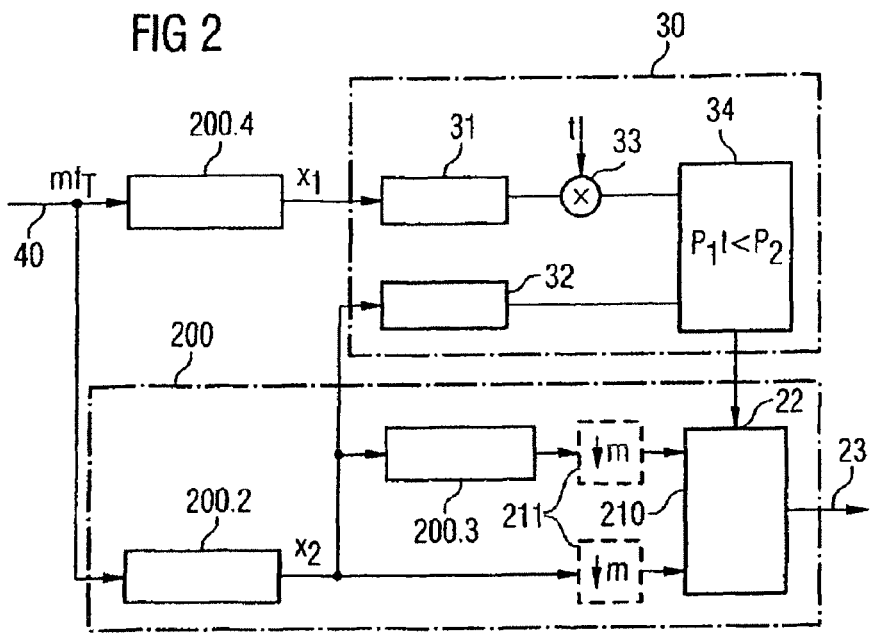
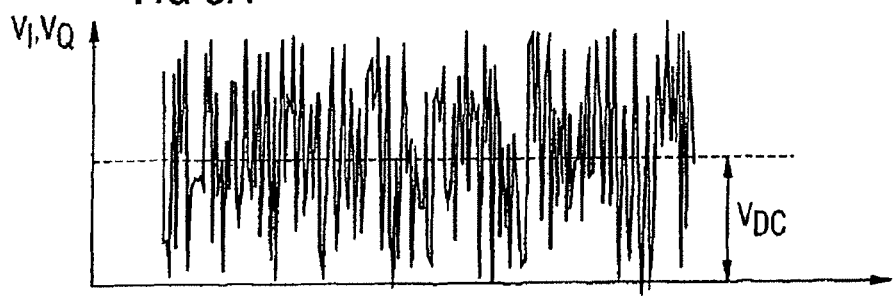
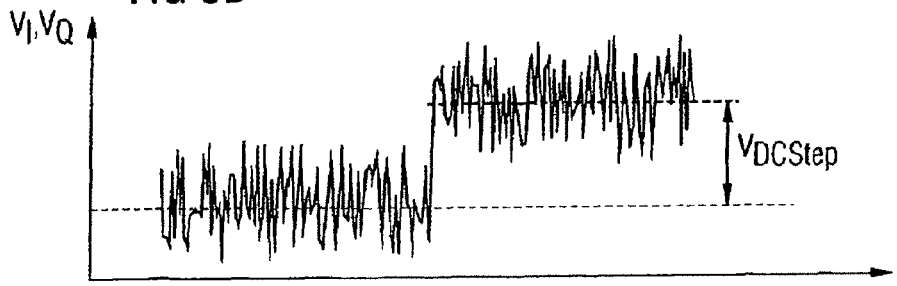

SUPPRESSION OF ADJACENT CHANNEL INTERFERENCE BY ADAPTIVE CHANNEL FILTERING IN MOBILE RADIO RECEIVERS

CROSS-REFERENCE TO RELATED APPLICATION

This application is a continuation of copending International Application No. PCT/DE03/03657 filed Nov. 5, 2003 which designates the United States, and claims priority to German application no. 102 53 671.6 filed Nov. 18, 2002.

TECHNICAL FIELD

The invention relates to an adaptive channel filter for a receiver unit for a mobile communications system, and to a method for setting a variable pass bandwidth for a channel filter.

BACKGROUND

In many mobile radio systems such as GSM (Global System for Mobile Communications) and its further development EDGE (Enhanced Data Services for GSM Evolution), the overall transmission bandwidth is subdivided into a large number of narrowband subscriber frequency bands (traffic channels). The bandwidth of a subscriber frequency band in GSM and EDGE systems is 200 kHz. FIGS. 1a to 1c show three important interference influences during reception of a narrowband payload signal such as this.

FIGS. 1a to 1c respectively show the spectral profile of a received signal 1 in the presence of interference 2.1, 2.2 and 2.3. FIG. 1a shows the narrowband received signal 1 in the presence of noise, which represents broadband interference 2.1. FIGS. 1b and 1c show two cases of multiple access interference, of multiple access interference (MAI), specifically cochannel interference (FIG. 1b) and adjacent channel interference (FIG. 1c). While the interference 2.2 in the case of cochannel interference occurs in the same subscriber frequency band as the desired signal 1, and is caused, for example, by an active subscriber in another cell in the network, the interference 2.3 in the case of adjacent channel interference occurs in one of the two adjacent subscriber frequency bands.

The influence of adjacent channel interference is influenced by the channel width of the subscriber frequency bands and the symbol frequency used in the system. In order to achieve a high system subscriber capacity and a high data rate, it is desirable to use narrow channel widths and high symbol frequencies. On the other hand, this results in an increase in the adjacent channel interference which, however, must not exceed a specific limit.

In the case of GSM and EDGE, the symbol frequency is 270.833 kHz and the channel width, as already mentioned, is 200 kHz. This means that the desired signal 1 and the interference 2.3 caused by adjacent channel interference spectrally overlap one another, as is shown in FIG. 1c. It is not possible to completely suppress the adjacent channel interference without constraining the spectrum of the desired signal 1.

In conventional receivers for mobile communications systems, the channel filter which is used to filter out the desired subscriber frequency band has a fixed, predetermined bandwidth. The chosen bandwidth represents a compromise between the mutually contradictory aims of utilization of the subscriber frequency band as well as possible for signal detection and suppression of adjacent channel interference as well as possible. This compromise is necessarily sub-optimal in many receiving situations.

The German Patent Application DE 101 52 628.8, which only represents the prior art in accordance with §3(2) of the German Patent Act with reference to the present application, has proposed an adaptive channel filter for mobile radio receivers and a method for adaptive channel filtering, in which the pass bandwidth of the channel filter is set as a function of the strength of the adjacent channel interference. This results in an adaptive channel filter by means of which the payload signal can always be optimally filtered in different receiving and interference situations.

FIG. 2 shows an embodiment which was described in this older application. The adaptive channel filter has a filter 200 with a variable pass bandwidth, and has a control device 30 for setting the pass bandwidth of the filter 200. The adaptive channel filter is preferably a digital low-pass filter, which is located in the baseband processing section of a mobile radio receiver. The signal 40 which is supplied to the adaptive channel filter has, for example, already been frequency-selected and/or subscriber-selected by suitable down-mixing of the frequency of the desired subscriber frequency band to baseband, but has not yet or has not been adequately bandwidth-limited.

The filter 200 which is shown with the dashed boundary and has a variable pass bandwidth has a first low-pass filter 200.2 which has a cut-off frequency above the desired signal. The filter 200 also has a series arrangement of the low-pass filter 200.2 and of a downstream constriction or limiting filter 200.3. The constriction filter 200.3 has the function of somewhat reducing the spectral pass band of the low-pass filter 200.2, that is to say the series arrangement of the filters 200.2 and 200.3 behaves like a single low-pass filter with a cut-off frequency which is lower than the cut-off frequency of the low-pass filter 200.2.

The outputs of the low-pass filters 200.2 and 200.3 are passed to the inputs of a selection switch 210. The selection switch 210 has a control input 22, via which one of the supplied filter signals can be selected and can be switched with a variable pass bandwidth to an output 23 of the filter 200.

A bandpass filter 200.4, to which the signal 40 is likewise supplied, is connected in parallel with the channel filter 200 with the variable pass bandwidth. The bandpass filter selects the spectral component from the adjacent channel interference source from the signal 40. The principle of operation of the adaptive channel filter shown in FIG. 2 is based on a power comparison between the signals x, and x2, which are filtered by the bandpass filter 200.4 and the low-pass filter 200.2 and are supplied to the control device 30. When strong adjacent channel interference is present, the power of the signal which is emitted from the low-pass filter 200.2 is relatively small in comparison to the power of the signal which is filtered by the bandpass filter 200.4, since the bandpass filter 200.4 passes a higher interference power than the low-pass filter 200.2. If the ratio of the two signal power levels exceeds a threshold value which is defined by the user, the selection switch 210 is actuated by the control device 30 such that the output of the low-pass filter 200.3, and thus of the series circuit comprising the low-pass filters 200.2 and 200.3, is produced with the lower overall cut-off frequency at the output 23 of the filter 200. Conversely, that is to say if the adjacent channel interference is low or is negligible, the ratio of the two power levels is below the predetermined threshold value, in which case the output of the low-pass filter 200.2 is selected by the selection switch 210, and is passed to the output 23. The bandpass filter 200.4 can be designed such that it extracts precisely that part of the signal power which is most valid for a power comparison in the control device 30.

The complex sample values x1($k$) and x2($k$) which are calculated by the filters 200.4 and 200.2 are passed to the control device 30. In each signal path, the control device 30 has an energy estimator 31 or 32, respectively, each of which contains a magnitude forming device and an accumulator, in this sequence. The energy estimator 31 in the path which is associated with the sample values x1($k$) is followed by a multiplier 33, which multiplies the sample values by a threshold value preset value t which can be defined by the user. The output of the multiplier 33 and the output of the energy estimator 32 in the other path are supplied to the two inputs of a comparator 34. The comparator 34 checks which of the two inputs has the greater value, and produces a corresponding comparison signal at its output. This is supplied in the manner which has already been described as a control signal to the input 22 of the selection switch 210.

In the energy estimators 31 and 32, the magnitude forming devices and the accumulators in each case calculate the sum of the magnitudes of the real and imaginary parts of both input signals over the accumulation time period which, for example, is the duration of a burst. This results in the adaptive channel filter having a behaviour which is adapted on a burst basis. The equation for the calculation of the output variables P1 and P2 is:

$$P_i = \sum_{k=1,\ldots,K} (|Re(x_i(k))| + |Im(x_i(k))|)(i=1,\ldots,N) \quad (1)$$

where N is the number of inputs of the control device 30, $x_i(k)$ are the sample values with the time index k supplied to the i-th input of the control device 30, and K is the number of sample values in a burst.

Instead of forming the sum of the magnitudes of the real and imaginary parts on the input signal, it is also possible to add the squares of the magnitudes.

The variables P1 and P2 are used as estimates of the respective signal power levels. The multiplier 33 multiplies the variable P1 by the threshold value preset value t. The variable PjXt is compared with the variable P2 in the comparator 34.

The adaptive channel filter which is illustrated in FIG. 1 has been implemented in GSM and EDGE receivers. An IIR (Infinite Impulse Response) filter with nine coefficients has been used for the bandpass filter 200.4. The low-pass filter 200.2 with a high cut-off frequency has been configured as a linear FIR (Finite Impulse Response) phase filter with 33 symmetrical coefficients. The constriction filter 200.3 has been chosen as a linear FIR phase filter with 13 symmetrical coefficients. The oversampling used in the receiver was m=2.

Thus, overall, a channel filter with a wide pass bandwidth is chosen when the adjacent channel interference is low, and a channel filter with a narrow pass bandwidth is used when the adjacent channel interference is high, and its desired frequency response is produced by cascading the low-pass filter 200.2 with a high cut-off frequency and the constriction filter 200.3. The ratio of the energy in the payload signal to the energy from the adjacent channel interference source is used as the criterion for selection of the channel filter. In this case, the energy from the adjacent channel interference source is multiplied by a predefined threshold t, and is compared with the energy from the adjacent channel interference source. If Pjt is less than P2, the output of the low-pass filter 200.2 is taken, otherwise the output from the constriction filter 200.3 is used.

FIG. 1 is based on the assumption that the clock rate of the signal is 40 m×$f_T$. The symbol frequency is denoted $f_T$, and is 270.833 kHz for GSM and EDGE. The oversampling factor is denoted m. For a channel filter in baseband, m is typically equal to 2. FIG. 1 shows that, with oversampling using the factor m, optional signal decimation can be carried out in each case between the low-pass filters 200.2 and 200.3 and the selection switch 210. The (optional) decimation is carried out by the decimators 211. The method of operation of each decimator 211 is to pass onto the output only one sample value from a group of m sample values, with the remaining m−1 sample values being rejected. The signal decimation is required only when signal processing is carried out at the symbol clock rate downstream from the adaptive channel filter.

The adaptive channel filter in FIG. 1 has the following disadvantage, however.

Owning to non-linearities in the RF receiver, each signal component (the payload signal or interference signal) at the input of the RF receiver also leads to a corresponding DC component (direct current, DC offset) in the quadrature-demodulated I and Q signals at the output, as is shown in FIG. 2a. In certain receiving situations, the DC offset can also vary within one burst. In this case, interference in the form of a step, a "DC step" is superimposed on the I and Q output signals, as is illustrated by way of example in FIG. 2b. The superimposition of a DC offset or DC step in the I and Q signals corrupts the estimate of the payload signal energy, while the DC interference in the energy estimate for the adjacent channel interference is largely suppressed owing to the bandpass filtering. Residual interference admittedly remains in the transition area of the DC step even after the bandpass filtering, but this lasts for a negligible time in comparison to the burst duration for energy estimation. The corruption of the energy measurement in one of the two paths leads to an increased error rate in the detection of the adjacent channel interference source, and thus to a deterioration in the reception quality.

SUMMARY

In consequence, the object of the present invention is to specify an adaptive channel filter which allows adequately good suppression of adjacent channel interference, while maintaining an adequate bandwidth, even in the presence of a DC signal component or DC component in the quadrature-demodulated I and Q signals in the receiver, and to specify a corresponding method for adaptive channel filtering having the stated characteristics.

This object can be achieved by an adaptive channel filter for a receiver unit for a mobile communications system, comprising a channel filter with a variable pass bandwidth, which comprises a first low-pass filter on the input side, a bandpass filter which is connected in parallel with the channel filter, a means for controlling the pass bandwidth of the channel filter as a function of the adjacent channel interference, having a first input which is connected to an output of the first low-pass filter, and having a second input which is connected to an output of the bandpass filter, and a means for removal of any DC signal component or DC component in the signal path which contains the first low-pass filter.

The means for removal of the DC signal component can be a notch filter. The means for removal of the DC signal component may comprise a DC signal estimator for estimation of the DC signal from an input signal, and may comprise an adder for subtraction of the estimated DC signal component from the input signal. The channel filter can be a digital low-pass filter in the baseband section of the receiver unit. The means for controlling the pass bandwidth also may take account of the noise, in addition to the adjacent channel interference. The channel filter with a variable pass bandwidth may comprise two or more filters which are arranged in series with one another and limit the bandwidth in steps, and may comprise a selection switch, at least some of whose inputs are connected to signal taps between the filters. The means for controlling the pass bandwidth may comprise in each case one energy estimator, which is connected to the two inputs and in each case calculates a variable which is representative of the power supplied to this input, and a comparison means which compares the variables calculated for different inputs with one another. The means for removal of the DC signal component can be arranged downstream of the first low-pass filter.

The object can also be achieved by a method for setting the variable pass bandwidth of a channel filter, having the steps of filtering of an input signal with a bandpass filter for production of a signal which is characteristic of an interference signal in an interference signal path, and having a low-pass filter for production of a signal which is characteristic of a payload signal in a payload signal path and for removal of the DC signal component in the payload signal path, calculating two variables which are characteristic of the signal powers of the two filtered signals, and setting of the pass bandwidth of the channel filter as a function of a comparison of the calculated variables.

The DC signal component in the payload signal path can be removed by means of a notch filter. The DC signal component in the payload signal path can be removed by first of all estimating it on the basis of the input signal and then subtracting it from the input signal.

Controlling the pass bandwidth of the channel filter as a function of the adjacent channel interference, that is to say in general as a function of a variable which is influenced by the strength of the adjacent channel interference, results in an adaptive channel filter using which the desired signal can always be filtered optimally in different receiving and interference situations. The means which is provided for removal of a DC signal component or DC component from the signal component passing through the first low-pass filter also ensures that the DC signal component does not lead to any corruption of the estimation of the payload signal energy.

The means for removal of the DC signal component may, in one embodiment, be formed by a notch filter. This is a special high-pass filter with high attenuation at the frequency zero. In order to achieve optimum detection of the adjacent channel interference source, it is desirable to use a notch filter with as narrow a stop band as possible, in order that the spectrum of the desired signal is filtered out as little as possible.

In another embodiment, the correction for the DC signal component is achieved by subtraction of an estimated DC signal value or DC value from the payload signal. In this case, a DC value is first of all estimated on a burst basis from the input signal. This estimated DC value is then subtracted from the input signal.

The adaptive channel filter according to the invention is preferably a digital low-pass filter in the baseband section of the receiver unit. In this case, the variable pass bandwidth is achieved by the low-pass filter having a variable upper cut-off frequency.

In addition to the (absolutely essential) relationship between the control of the pass bandwidth of the channel filter and the adjacent channel interference, it is also possible to take into account further influencing variables in the control of the pass bandwidth of the channel filter. In this context, one advantageous embodiment variant of the adaptive channel filter is characterized in that the means for controlling the pass bandwidth also takes account of the noise, in particular its strength.

In this case, the means for controlling the pass bandwidth is expediently designed to set the channel filter to a first, narrow pass bandwidth when the adjacent channel interference is high, and to set it to a second pass bandwidth, which is wider than the first pass bandwidth, when the adjacent channel interference and the noise are low, and to set a third pass bandwidth when the adjacent channel interference is low and the noise dominates the adjacent channel interference, which third pass bandwidth is wider than the first but narrower than the second pass bandwidth. The (reasonable) reduction in the pass bandwidth when the noise level is high results in the noise bandwidth of the received signal being reduced, but without causing excessively great signal distortion during the process.

BRIEF DESCRIPTION OF THE DRAWINGS

Exemplary embodiments of an adaptive channel filter will be explained in more detail in the following text with reference to the further drawings, in which:

FIG. 2 shows a block diagram of an adaptive channel filter which is only prior art in accordance with 3(2) of the German Patent Act;

FIGS. 3a-b show quadrature-demodulated I and Q signals with a DC component (a) and with a DC step within a burst (b);

DETAILED DESCRIPTION

Figure 1A:
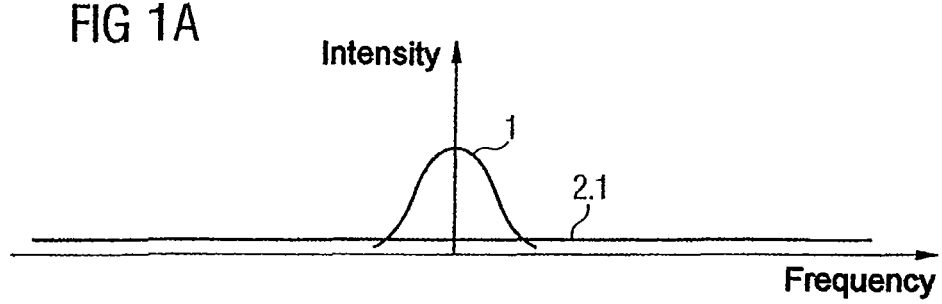
FIGS. 1a-1c show signal spectra in the presence of various interference sources, specifically broadband noise, cochannel interference and adjacent channel interference.
Figure 1B:
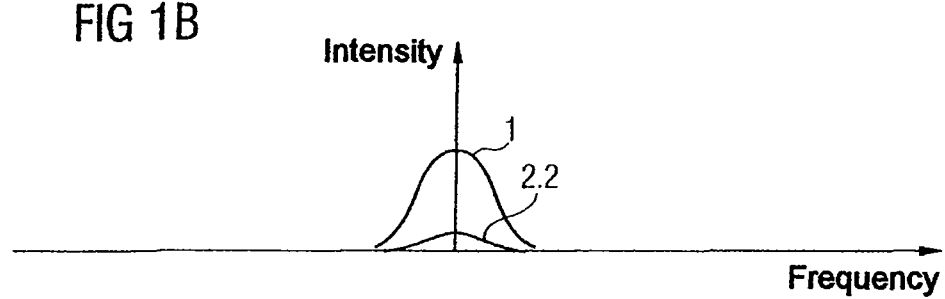
Figure 1C:
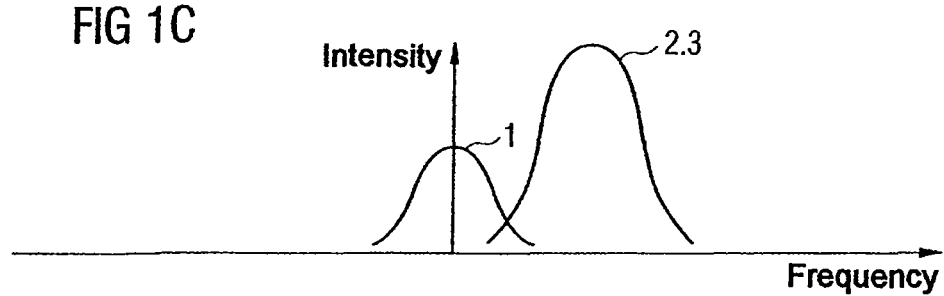
Figure 4:
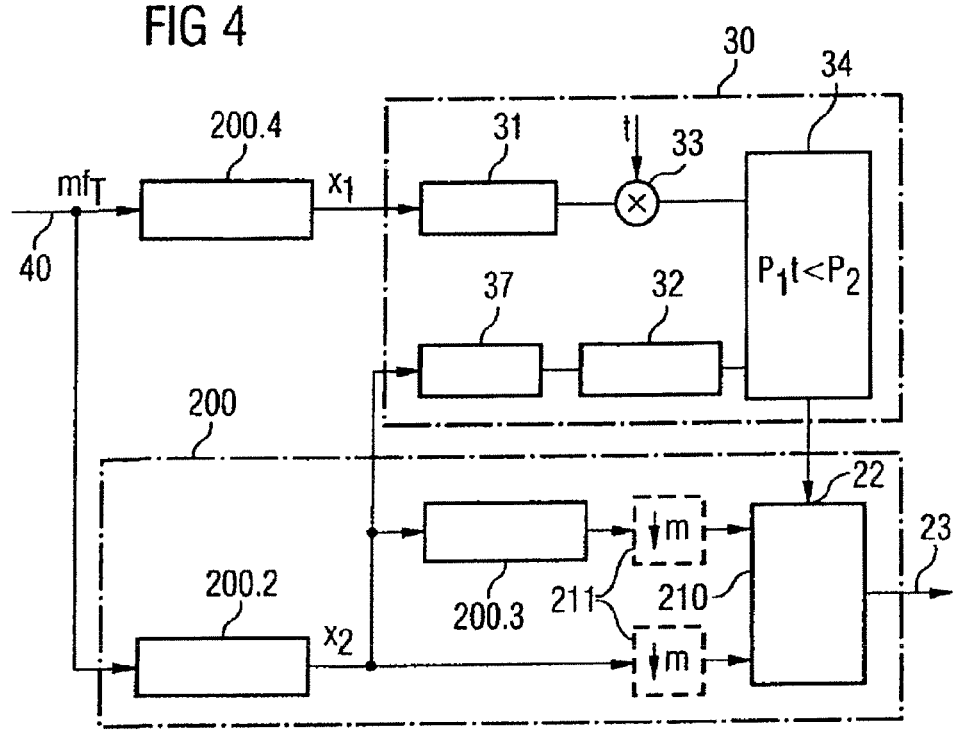
FIG. 4 shows a block diagram of one exemplary embodiment of an adaptive channel filter according to the invention.

In the block diagram shown in FIG. 4 of one exemplary embodiment of an adaptive channel filter according to the invention, the reference symbols of the circuit components which are functionally equivalent and which are the same as those used for the adaptive channel filter shown in FIG. 1 have been retained. Furthermore, a DC correction device 37 has been inserted into the payload signal path upstream of the energy estimator 32, with the object of removing the DC signal component or DC component from this signal component. In the exemplary embodiment, the DC correction device 37 is a part of the control device 30. However, this is not of major technical significance for the present invention. It is equally well possible to provide for the control device 30 to be transferred essentially unchanged from the cited prior art and for the additional DC correction device 37 to be arranged upstream of the control device 30 in the payload signal path. It is likewise theoretically feasible for the DC correction device 37 to be arranged in the payload signal path upstream of the first low-pass filter 200.2, in order to remove the DC component even before the low-pass filtering.

In a first embodiment, the DC correction device 37 may be formed by a notch filter. In this case, this is a special high-pass filter which has high attenuation at the frequency 0. For optimum detection of the adjacent channel interference source, the notch filter preferably has as narrow a stop band as possible in order that the spectrum of the desired signal is filtered out as little as possible. On the other hand, this results in the step-function response having a longer decay time which, in the event of interference resulting from a DC step, once again leads to increased corruption of the energy estimate for the payload signal. An optimum notch filter represents a compromise between these mutually contradictory requirements. A low-order FIR or IIR filter is used for a cost-effective solution that takes account of these requirements.

The following equations indicate the transfer functions of two simple notch filters in the form of first and second order FIR filters.

$$H_{FIR1}(z)=1-z^{-1} \quad (2)$$

$$H_{FIR2}(z)=1-2z^{-1}+z^{-2} \quad (3)$$

As is known, both filters have very high attenuation at the frequency 0, and a step-function response with a very short decay time. Both filters thus provide good DC suppression and DC-step suppression. The broad stop band of the two filters has the disadvantage, however, that a relatively high proportion of the payload spectrum is also filtered out in the process.

An even better compromise can be achieved here by means of recursive filters. Even a first-order IIR filter can be used to produce a notch filter with a very narrow stop band. The following equation describes the transfer function of an IR notch filter such as this.

$$H_{IIR}(z) = \frac{1-z^{-1}}{1-az^{-1}} \quad (4)$$

The parameter a allows the width of the stop band to be interchanged with the decay time period of the step-function response. When a=0, the IIR filter merges into the FIR filter described by equation 2 above. Simulations have shown that a good compromise is achieved with a=0.5.

Figure 5:
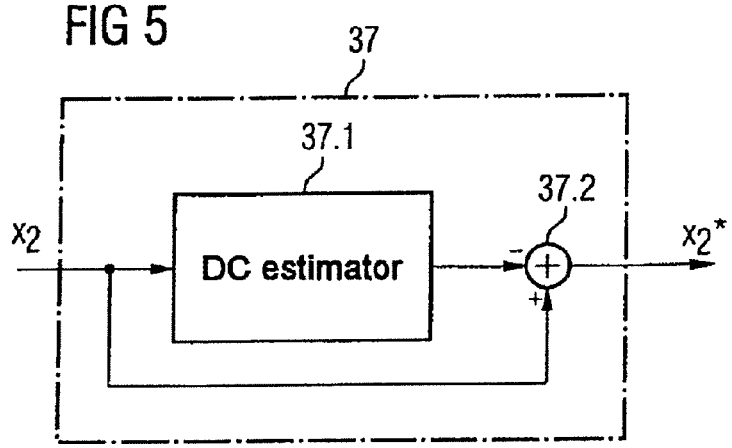
FIG. 5 shows an exemplary embodiment of a DC correction device.

In a second embodiment, the DC correction device 37 is implemented by estimation of the DC value of the signal $X_2$ in the payload signal 2, followed by subtraction of the estimate of the DC value from the signal. This is illustrated in FIG. 5. In consequence, the DC correction device 37 contains a DC estimator 37.1 and an adder 37.2. A DC value is estimated from the input signal $X_2$ on a burst basis in the DC estimator 37.1, and the estimated DC value is subtracted from the input signal $X_2$ in the adder 37.2. The simplest method for estimation of the DC value is to form the average value of the input signal over a specific time period M:

$$X_{DC} = \frac{1}{M}\sum_{k=1}^{M} x_2(k) \quad (5)$$

where $x_2$ is the complex input signal and $x_{DC}$ is the estimated complex DC value. The DC correction can now be written as follows:

$$x_2^*(i)=x_s(i)-x_{DC} \quad i=1,2,\ldots,N \quad (6)$$

where N represents the number of data samples per burst.

In contrast to the notch filter in the first embodiment, the second embodiment has the disadvantage that it is more complex, since the DC estimate has the required accuracy only with relatively large M<N, and that residual interference always remains in the event of a DC step, whose extent depends on the magnitude of the DC step.

What is claimed is:

1. An adaptive channel filter for a receiver unit for a mobile communications system, comprising:
    a channel filter with a variable pass bandwidth, the channel filter comprising a first low-pass filter and a second filter configured to receive an output of the first low-pass filter;
    a bandpass filter that is connected in parallel with the channel filter;
    a controller configured to select an output of the channel filter from the output of the first low-pass filter and an output of the second filter to control the pass bandwidth of the channel filter as a function of adjacent channel interference, comprising:
        a first input that is connected to the output of the first low-pass filter; and
        a second input that is connected to an output of the bandpass filter; and
    a DC correction device configured to remove a DC signal component or DC component in a signal path that contains the first low-pass filter.

2. The adaptive channel filter as claimed in claim 1, wherein the DC correction device is a notch filter.

3. The adaptive channel filter as claimed in claim 1, wherein the DC correction device comprises:
    a DC signal estimator configured to estimate the DC signal from an input signal, and
    an adder configured to subtract the estimated DC signal component from the input signal.

4. The adaptive channel filter as claimed in claim 1, wherein the controller is configured to control the pass bandwidth of the channel filter as a function of noise within an input signal.

5. The adaptive channel filter as claimed in claim 1, wherein the first low-pass filter and the second filter are arranged in series with one another and are configured to limit the bandwidth in steps, and wherein the channel filter comprises a selection switch, at least some of whose inputs are connected to signal taps between the first low-pass filter and the second filter.

6. The adaptive channel filter as claimed in claim 1, wherein the controller comprises:
    a first energy estimator connected between the output of the first low-pass filter and the first input of the controller, and configured to calculate a power supplied to the first input;
    a second energy estimator connected between the output of the bandpass filter and the second input of the controller, and configured to calculate a power supplied to the second input; and
    a comparator configured to compare the calculated power supplied to the first input and the calculated power supplied to the second input, and to generate a control signal based on the comparison.

7. The adaptive channel filter as claimed in claim 1, wherein the DC correction device is arranged downstream of the first low-pass filter.

8. The adaptive channel filter as claimed in claim 1, wherein the channel filter and the bandpass filter are configured to operate on a same signal.

9. The adaptive channel filter as claimed in claim 1, wherein the channel filter and the bandpass filter are separate filters.

10. The adaptive channel filter as claimed in claim 1, wherein the bandpass filter is configured to produce a signal which is characteristic of the adjacent channel interference.

11. The adaptive channel filter as claimed in claim 1, wherein the channel filter is a digital low-pass filter in the baseband section of the receiver unit.

12. The adaptive channel filter as claimed in claim 6, wherein the controller is configured to select the output of the channel filter based on the control signal.

13. A method for setting the variable pass bandwidth of a channel filter, comprising:
  filtering an input signal with a bandpass filter to produce a first signal that is characteristic of an interference signal in an interference signal path, and having a first low-pass filter and a second filter connected to an output of the first low-pass filter to produce a second signal that is characteristic of a payload signal in a payload signal path and for removal of a DC signal component in the payload signal path;
  calculating first and second signal powers of the filtered first and second signals, respectively; and
  selecting an output of the channel filter from the output of the first low-pass filter and an output of the second filter to set the pass bandwidth of the channel filter, wherein the selecting is based on a comparison of the calculated first and second signal powers.

14. The method as claimed in claim 13, wherein the DC signal component in the payload signal path is removed using a notch filter.

15. The method as claimed in claim 13, wherein the removal of the DC signal component comprises:
  estimating the DC signal component; and
  subtracting the DC signal component from the input signal.

16. The method as claimed in claim 13, wherein the channel filter and the bandpass filter are configured to operate on the input signal.

17. The method as claimed in claim 13, wherein the channel filter and the bandpass filter are separate filters.

18. An adaptive channel filter for a receiver unit for a mobile communications system, comprising:
  a channel filter with a variable pass bandwidth, the channel filter comprising a first low-pass filter and a second filter configured to receive an output of the first low-pass filter;
  a bandpass filter that is connected in parallel with the channel filter;
  a pass bandwidth controller configured to select an output of the channel filter from the output of the first low-pass filter and an output of the second filter to control the pass bandwidth as a function of adjacent channel interference, comprising a first input connected to the output of the first low-pass filter, and a second input connected to an output of the bandpass filter, and
  a DC component removal unit arranged in a signal path that includes the first low-pass filter.

19. The adaptive channel filter as claimed in claim 18, wherein the DC component removal unit is a notch filter.

20. The adaptive channel filter as claimed in claim 18, wherein the DC component removal unit comprises:
  a DC signal estimator configured to estimate the DC signal from an input signal, and
  an adder configured to subtract the estimated DC signal component from the input signal.

21. The adaptive channel filter as claimed in claim 18, wherein the pass bandwidth controller is configured to control the pass bandwidth of the channel filter as a function of noise within an input signal.

22. The adaptive channel filter as claimed in claim 18, wherein the first low-pass filter and the second filter are arranged in series with one another and are configured to limit the bandwidth in steps, and wherein the channel filter comprises a selection switch, at least some of whose inputs are connected to signal taps between the first low-pass filter and the second filter.

23. The adaptive channel filter as claimed in claim 18, wherein the pass bandwidth controller comprises:
  a first energy estimator connected between the output of the first low-pass filter and the first input of the controller, and configured to calculate a power supplied to the first input;
  a second energy estimator connected between the output of the bandpass filter and the second input of the controller, and configured to calculate a power supplied to the second input, and
  a comparator configured to compare the calculated power supplied to the first input and the calculated power supplied to the second input, and to generate a control signal based on the comparison.

24. The adaptive channel filter as claimed in claim 18, wherein the DC component removal unit is arranged downstream of the first low-pass filter.

25. The adaptive channel filter as claimed in claim 18, wherein the channel filter and the bandpass filter are configured to operate on a same signal.

26. The adaptive channel filter as claimed in claim 18, wherein the channel filter and the bandpass filter are separate filters.

27. The adaptive channel filter as claimed in claim 18, wherein the bandpass filter is configured to produce a signal which is characteristic of the adjacent channel interference.

28. An adaptive channel filter for a receiver unit for a mobile communications system, comprising:
  a channel filter with a variable pass bandwidth, the channel filter comprising a first low-pass filter and a second filter configured to receive an output of the first low-pass filter;
  a bandpass filter that is connected in parallel with the channel filter;
  a controller configured to select an output of the channel filter from the output of the first low-pass filter and an output of the second filter to control the pass bandwidth of the channel filter; and
  a DC correction device configured to remove a DC signal component or DC component in a signal path that contains the first low-pass filter.

* * * * *